US010126543B2

(12) United States Patent
Massard

(10) Patent No.: US 10,126,543 B2
(45) Date of Patent: *Nov. 13, 2018

(54) WATER CONTENT OF A FLUID OF AN ELECTROWETTING ELEMENT

(71) Applicant: Amazon Technologies, Inc., Seattle, WA (US)

(72) Inventor: Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,795

(22) Filed: Sep. 29, 2016

(65) Prior Publication Data

US 2017/0017073 A1    Jan. 19, 2017

Related U.S. Application Data

(63) Continuation of application No. 13/718,489, filed on Dec. 18, 2012, now Pat. No. 9,457,330, which is a continuation of application No. PCT/EP2011/060114, filed on Jun. 17, 2011.

(30) Foreign Application Priority Data

Jun. 18, 2010    (GB) .................................. 1010296.0

(51) Int. Cl.
| | | |
|---|---|---|
| G02B 1/06 | (2006.01) | |
| G02B 26/00 | (2006.01) | |
| B01F 17/00 | (2006.01) | |
| B01F 17/54 | (2006.01) | |
| G09G 3/34 | (2006.01) | |

(52) U.S. Cl.
CPC ........ *G02B 26/005* (2013.01); *B01F 17/0014* (2013.01); *B01F 17/0021* (2013.01); *B01F 17/0028* (2013.01); *B01F 17/0071* (2013.01); *B01F 17/0085* (2013.01); *G09G 3/348* (2013.01)

(58) Field of Classification Search
CPC ............................... G02B 26/005; G02B 1/06
See application file for complete search history.

(56) References Cited

U.S. PATENT DOCUMENTS

| | | | | |
|---|---|---|---|---|
| 7,729,057 | B2 * | 6/2010 | Maillard | .................. G02B 3/14 |
| | | | | 359/665 |
| 7,839,555 | B2 | 11/2010 | Nakano et al. | |
| 2004/0016178 | A1 * | 1/2004 | Rajagopalan | .......... A01G 9/024 |
| | | | | 47/67 |
| 2006/0206075 | A1 | 9/2006 | Tanaka et al. | |
| 2007/0040982 | A1 | 2/2007 | Nakano et al. | |
| 2007/0179200 | A1 | 8/2007 | Liogier D'Ardhuy et al. | |
| 2007/0179201 | A1 | 8/2007 | Maillard et al. | |
| 2010/0108516 | A1 * | 5/2010 | Bartels | ................. G02B 26/005 |
| | | | | 204/547 |
| 2014/0016178 | A1 | 1/2014 | Rosser | |
| 2014/0190323 | A1 * | 7/2014 | Khalaf | ................... B29B 17/02 |
| | | | | 83/13 |

FOREIGN PATENT DOCUMENTS

| | | |
|---|---|---|
| CN | 1784625 A1 | 6/2006 |
| CN | 1831566 A | 9/2006 |
| CN | 101395494 A1 | 3/2009 |
| CN | 101395495 A | 3/2009 |
| EP | 1701196 * | 9/2006 |
| EP | 1701196 A1 | 9/2006 |
| EP | 1816504 A1 | 8/2007 |
| EP | 2071385 A1 | 6/2009 |
| JP | 2006195190 A | 7/2006 |
| JP | 2009525503 A | 7/2009 |
| KR | 20060099418 A | 9/2006 |
| KR | 20080091786 A | 10/2008 |
| WO | 2003071346 A1 | 8/2003 |
| WO | 2009525503 A1 | 8/2003 |
| WO | 2004099845 A1 | 11/2004 |
| WO | 2005098524 A1 | 10/2005 |
| WO | 2006017129 A2 | 2/2006 |
| WO | 2007088453 A1 | 8/2007 |
| WO | 2007088454 A2 | 8/2007 |
| WO | 2007113637 * | 10/2007 |
| WO | 2007113637 A1 | 10/2007 |
| WO | 2008053144 A1 | 5/2008 |
| WO | 2008059039 A1 | 5/2008 |
| WO | 2008119774 A1 | 10/2008 |
| WO | 2008125644 A1 | 10/2008 |
| WO | 2008142086 * | 11/2008 |
| WO | 2008142086 A1 | 11/2008 |
| WO | 2008142378 A1 | 11/2008 |
| WO | 2008150668 A1 | 12/2008 |
| WO | 2010015691 A1 | 2/2010 |

(Continued)

OTHER PUBLICATIONS

European Search Report dated Sep. 20, 2017 for EP Application No. 11737907.3.

(Continued)

*Primary Examiner* — Charles I Boyer
(74) *Attorney, Agent, or Firm* — EIP US LLP

(57) ABSTRACT

An electrowetting element comprises a first fluid and a second fluid substantially immiscible with the first fluid. Greater than or equal to 0.05 wt % and less than or equal to 15 wt % of the second fluid is water.

29 Claims, 1 Drawing Sheet

(56) References Cited

FOREIGN PATENT DOCUMENTS

| WO | 2010018381 A1 | 2/2010 |
| WO | 2010031860 A2 | 3/2010 |

OTHER PUBLICATIONS

Korean Notice of Reasons for Rejection dated Jul. 20, 2017 for Korean Application No. 10-2013-7001093.
Nanayakkara et al.: A fundamental study on electrowetting by traditional and multifunctional ionic liquids: possible use in electrowetting on dielectric-based microfludic applications, Analytical Chemistry, vol. 80, No. 20, Oct. 15, 2008, pp. 7690-7698.

\* cited by examiner

WATER CONTENT OF A FLUID OF AN ELECTROWETTING ELEMENT

CROSS-REFERENCE TO RELATED APPLICATIONS

This application is a continuation of U.S. patent application Ser. No. 13/718,489, filed Dec. 18, 2012, which is a continuation of PCT patent application no. PCT/EP2011/060114, filed Jun. 17, 2011, which claims priority to U.K. patent application no. GB 1010296.0, filed on Jun. 18, 2010. Each of the above-described applications are incorporated by reference in their entirety herein.

BACKGROUND

Electrowetting display devices are known. Such display devices use at least two immiscible fluids, for example an oil liquid and an aqueous liquid, to provide changeable display effects.

Various types of fluids are known for electrowetting elements and displays. For example, a polar fluid may be an aqueous salt solution of sodium, calcium or potassium chloride.

The choice of fluids for an electrowetting element/display is important. Factors such as corrosion and therefore element lifetime, switching performance and operating temperature range, amongst others, influence the choice. Currently known liquids for electrowetting do not meet the requirements for an electrowetting element or display.

It is desirable to provide improvements to a fluid for an electrowetting element.

DETAILED DESCRIPTION

Figure 1:
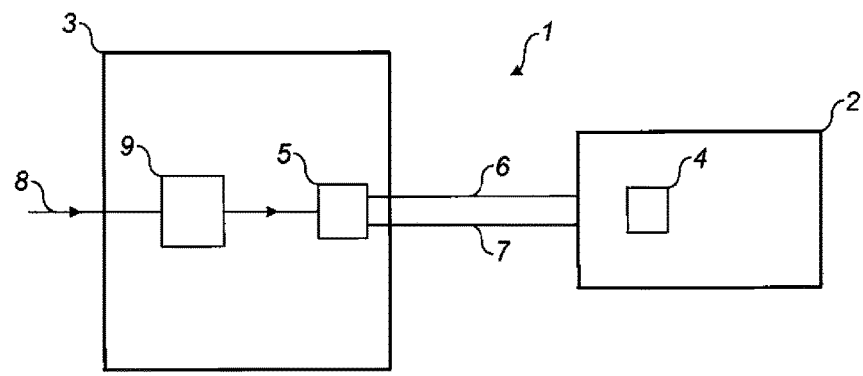
FIG. 1 shows a display apparatus including a display element.

In accordance with first embodiments, there is provided an electrowetting element comprising a first fluid and a second fluid which are immiscible with each other and are switchable between a first configuration and a second configuration by changing a voltage applied to at least one of the first and second fluids, wherein less than or equal to 35 wt % of the second fluid is water and a balancing wt % of the second fluid comprises at least one non-aqueous component.

Surprisingly, less than or equal to 35 wt % of water in the second fluid gives an improved performance of the electrowetting element compared with greater than 35 wt % of water. Characteristics giving rise to this improved performance are described now and further below. Less than or equal to 35 wt % of water in the second fluid reduces corrosion within the element caused by the second fluid, and therefore improves the lifetime of the element. Also, corrosion of equipment for manufacturing the element is reduced. Further, less than or equal to 35 wt % of water does not restrict viscosity requirements of the second fluid, meaning for the example of an electrowetting display element that video speed switching can be provided. Further still, the second fluid according to embodiments is versatile as it may be formulated to give electrowetting performance within a desired temperature range for example between −20 to +70° C., a suitably low voltage threshold for fluid switching owing to a reduced surface tension (and therefore typically a reduced interfacial tension with the oil) and a low, if any, extent of backflow. Backflow is described further in International patent publication no. WO/2008/142086.

The term wt % used herein means a percentage by total weight of the second fluid. The term balancing wt % means the difference in percentage by total weight of the second fluid between 100 wt % of the second fluid and the wt % of water. Since the second fluid comprises less than or equal to 35 wt % of water, the balancing wt % is 65 wt % or greater, in dependence on the wt % of water. For example, if the second fluid comprises 35 wt % of water the balancing wt % is 65 wt %. In accordance with embodiments, the balancing wt % comprises at least one non-aqueous component. Therefore, for example, where the balancing wt % is 65 wt %, the second fluid may comprise 35 wt % of a first non-aqueous component and 30 wt % of second non-aqueous component, the wt % of the first and second non-aqueous components thus totaling the balancing wt % of 65 wt %.

In embodiments the wt % of water in the second fluid may be less than or equal to a maximum equilibrium hygroscopic amount of water. The maximum equilibrium hygroscopic amount of water for the second fluid will depend on the composition of the second fluid and its affinity for water. The second fluid may comprise less than its maximum equilibrium hygroscopic amount of water depending on for example the manufacturing process of the element, including any drying steps to remove water and/or manufacturing in a water free environment, and depending on the water content of other parts of the element, for example the first fluid. Examples of maximum equilibrium hygroscopic amounts of water are given further below for examples of non-aqueous components of the second fluid. The maximum equilibrium hygroscopic amount of water is, in various embodiments significantly, less than 35 wt %, thus further improving the performance of the element in respect of the characteristics described above.

In embodiments the wt % of water in the second fluid may be zero. In such embodiments any corrosion of the element due to presence of water in the second fluid is minimized. Further, for example, any backflow may be further reduced if not eliminated, and the operating voltage of the display may be reduced further.

In alternative embodiments the wt % of water in the second fluid may be greater than or equal to 0.5, 1, or 1.5 wt %. In such embodiments a quantity of water of 0.5, 1 or 1.5 wt % can provide an increase in surface tension of the second fluid, compared with a zero wt % of water. This increase can improve switching performance of the element and moreover provides a further degree of design freedom for tuning the element to provide a desired switching performance, for example. Thus, for certain element requirements a zero wt % of water may not be desirable. Moreover, with a wt % of water of 0.5, 1 or 1.5 wt % the element has desirable switching performance, for example with very low corrosion.

In some embodiments the wt % of water in the second fluid is selected from the group consisting of: 2 to 35 wt %; 2.5 wt % to 35 wt %; 3 to 35 wt %; 4 to 35 wt %; and 5 to 35 wt %.

In other embodiments, the wt % of water in the second fluid is selected from the group consisting of: 0.5 to 34.5 wt %; 0.5 to 34 wt %; 0.5 to 33.5 wt %; 0.5 to 33 wt %; 0.5 to 32.5 wt %; 0.5 to 30 wt %; 0.5 to 25 wt %; 0.5 to 20 wt %; 0.5 to 15 wt %; 0.5 to 10 wt %; 0.5 to 7.5 wt %; 0.5 to 7 wt %; 0.5 to 6.5 wt %; 0.5 to 6 wt %; 0.5 to 5.5 wt %; 0.5 to 5 wt %; 1 to 34.5 wt %; 1 to 34 wt %; 1 to 33.5 wt %; 1 to 33 wt %; 1 to 32.5 wt %; 1 to 30 wt %; 1 to 25 wt %; 1 to 20 wt %; 1 to 15 wt %; 1 to 10 wt %; 1 to 7.5 wt %; 1 to 7 wt %; 1 to 6.5 wt %; 1 to 6 wt %; 1 to 5.5 wt %; 1 to 5 wt %; 1.5 to 34.5 wt %; 1.5 to 34 wt %; 1.5 to 33.5 wt %; 1.5 to 33 wt %; 1.5 to 32.5 wt %; 1.5 to 30 wt %; 1.5 to 25 wt %; 1.5 to 20 wt %; 1.5 to 15 wt %; 1.5 to 10 wt %; 1.5 to 7.5 wt %; 1.5 to 7 wt %; 1.5 to 6.5 wt %; 1.5 to 6 wt %; 1.5 to 5.5 wt %; and 1.5 to 5 wt %.

In other embodiments the wt % of water in the second fluid is selected from the group consisting of: 2 to 32 wt %; 2.5 to 31 wt %; 3 to 30 wt %; 3.5 to 29 wt %; 4 to 28 wt %; 4.5 to 27 wt %; 5 to 26 wt %; 5.5 to 25 wt %; 6 to 24 wt %; 6.5 to 23 wt %; 7 to 22 wt %; 7.5 to 21 wt %; 8 to 20 wt %; 8.5 to 19 wt %; 9 to 18 wt %; 9.5 to 17 wt %; 10 to 16 wt %; 10.5 to 15 wt %; 11 to 14 wt %; and 11.5 to 13 wt %.

By appropriate selection of the wt % of water in the second fluid, the second fluid properties can be tuned to obtain desired performance of the element. This allows a balance to be obtained between properties such as element lifetime related to corrosion susceptibility, switching performance and operating temperature range, the latter two being related to fluid viscosity, surface tension characteristics and thermal properties. Further characteristics such as those described above may also be tuned by selecting the wt % of water.

In embodiments the at least one non-aqueous component comprises at least one component with a general formula comprising carbon and oxygen, a ratio of the number of oxygen atoms to the number of carbon atoms being greater than 1:2, there being at least two carbon atoms. It has been surprisingly realized that switching performance of the element may be improved when at least one component of the at least one non-aqueous component meets this general formula. Further, compounds meeting this general formula have low, if any, corrosion effects on the element, as well as improved backflow properties and other characteristics described above.

In further embodiments each component of the at least one non-aqueous component has the general formula comprising carbon and oxygen, a ratio of the number of oxygen atoms to the number of carbon atoms being greater than 1:2, there being at least two carbon atoms. This gives desirable element performance including desirable lifetime and switching properties, described above. The lifetime may therefore be several years, for example three or more years.

In further embodiments the at least one non-aqueous component may comprise a polyether; a peroxide; a polyol such as a diol, a triol and/or a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; and/or aconitric acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; derivatives thereof; and combinations thereof. Examples of such components are described further below.

In some example embodiments, the at least one non-aqueous component includes a first non-aqueous component selected from the group consisting of: ethylene glycol; diethyleneglycol; polyethylene glycol; propylene glycol; dioxalane; glyoxal; citric acid; oxalic acid; oxamic acid; and formic acid; and wherein the at least one non-aqueous component includes a second non-aqueous component which is different from the first non-aqueous component and is selected from the group consisting of: erythritol; ethylene carbonate; propylene carbonate; ethylene glycol; glycerol; and butanetriol.

In further embodiments the balancing wt % of the second fluid may comprise a ratio of the first non-aqueous component wt % to the second non-aqueous component wt % of 100:0, 90:10, 80:20, 75:25, 70:30, 65:35, 60:40, 55:45; 50:50, 45:55; 40:60, 35:65; 30:70, 25:75; 20:80, 10:90 or 0:100. For example, with a water wt % of 35, and thus a balancing wt % of 65, the ratio of 90:10 would correspond to a 58.5 wt % of the first non-aqueous component and a 6.5 wt % of the second non-aqueous component to total the balancing wt % of 65. By changing the wt % ratio of the first and second non-aqueous components, the second fluid properties can be tuned to provide the element with desired performance characteristics.

In some embodiments, where the balancing wt % comprises only first and second non-aqueous components, the first and second non-aqueous components may be, respectively, ethylene glycol and ethylene carbonate, ethylene glycol and propylene carbonate, ethylene glycol and glycerol, diethylene glycol and glycerol, or polyethylene glycol and glycerol. It has been surprisingly realized that such mixtures of the first and second non-aqueous components forming the balancing wt % provide desirable performance in the display element. This is the case when the water wt % is zero but applies also to embodiments with a water wt % greater than 0 and less than 35 wt %. The ratio of the first non-aqueous component to the second non-aqueous component may be in accordance with the example wt % ratios of first to second non-aqueous components described above; ratios of the first to the second non-aqueous component of 60:40, 70:30, 80:20 of the balancing wt % have been found to give desirable performance in respect of at least the characteristics above, for example a low switching voltage threshold, low or no backflow, correct switching operation in a range of temperatures for example −20 to +70° C., low corrosion of the element and manufacturing apparatus, easy cleaning of second fluid residue on manufacturing apparatus, low toxicity, low cost, and, as explained below, reduced photo-bleaching of a dye in the first fluid. A ratio of the first to the second non-aqueous component of 80:20, 70:30, 60:40 and 50:50 are each suitable for displaying video content but other ratios may be used. Any first to second non-aqueous component ratio within the range 100:0 to 0:100 is suitable for displaying static content. Further embodiments with similar effects as the embodiments just described have been identified where the balancing wt % is formed of three different non-aqueous components, being for example one of the first and second non-aqueous components mixtures described above, and a third non-aqueous component such as for example ethylene carbonate or propylene carbonate.

In other embodiments, the first fluid may comprise at least one dye and the composition of the second fluid is selected in accordance with the at least one dye. Selecting the composition of the second fluid includes selecting a water wt % and the components constituting the balancing wt % and their quantities. It has been unexpectedly identified that selection of the composition of the second fluid in accordance with the dye gives certain effects. For example, depending on the dye in the first fluid, the dye may be susceptible to photo-bleaching over the lifetime of the element; further details are described in, for example, International patent publication no. WO/2010/031860. Surprisingly, photo-bleaching may be reduced or eliminated by providing in the element the second fluid described in accordance with embodiments. This is unexpected as the dye lies in the first fluid and not in the second fluid. Without being bound to any theory it is believed the examples of the second fluid described above for embodiments, which all comprise less than or equal to 35 wt % of water, influence the oxygen content in the first fluid to the extent that photo-bleaching of the dye is reduced. Reducing the water content of the second fluid reduces the oxygen content of the first fluid accordingly. This realization allows dye photo-bleaching to be reduced, if not eliminated, thus increasing the lifetime of the element for high quality color image reproduction. The increased lifetime may be several years, for example years or greater.

In embodiments the second fluid may have a surface tension greater than 30, 35, 40 or 45 mN m$^{-1}$. This surface tension may be obtained by choosing the amount of water in the second fluid, and/or the selection of and quantity of the at least one non-aqueous component in the second fluid. The surface tension of the second fluid may be tuned in order to obtain desired switching properties. A surface tension of greater than 30, 35, 40 or 45 mN m$^{-1}$ gives a suitably low but workable threshold for the fluid switching voltage, amongst other switching characteristics described above.

In embodiments the electrowetting element is a display element for an electrowetting display device.

According to further embodiments there is provided a fluid in accordance with any of the embodiments of the second fluid described herein. Moreover, in other embodiments there is provided a use of any of the second fluid embodiments described herein in an electrowetting display device.

Examples of embodiments will now be described in detail.

FIG. 1 shows schematically a display apparatus 1 including an electrowetting display device 2 and a display driving system 3. In accordance with embodiments there is provided an electrowetting element which in this example is a display element 4 of which the display device has at least one. A driver stage 5 in the display driving system is connected to the display device by means of signal lines 6 and 7. The driver stage outputs a display voltage in response to a data signal input to the display driving system by a data signal line 8, the data signal representing a display state to be shown by the display device 2. When the display device includes a two-dimensional array of display elements, for example an active matrix array, the data signal may be a TV signal and the combined display states of the display elements forms an image. The display driving system may include a display controller 9 connected to the data signal line 8 and providing signal levels and timing for the control of the display element. The driver stage 5 transforms the output of the display controller 9 to a signal suitable for controlling the display element 4.

Figure 2:
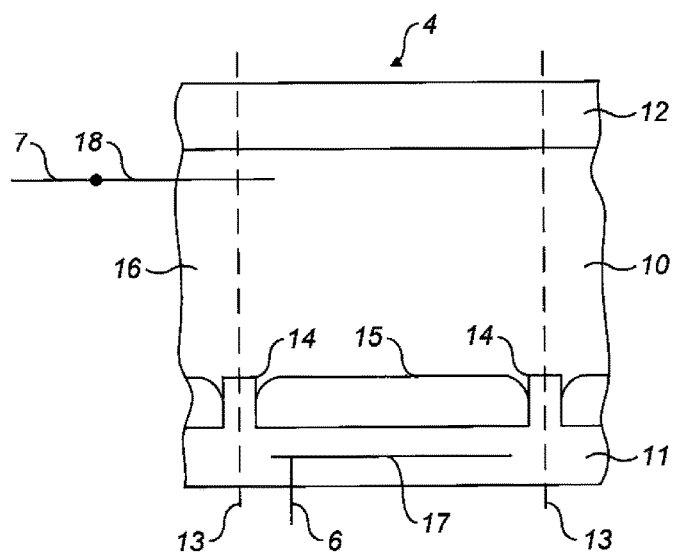
FIG. 2 shows a cross-section of an electrowetting element according to an embodiment.

In accordance with an embodiment, the display element 4, shown in cross-section in FIG. 2, includes a space 10 between a first support plate 11 and a second support plate 12, the lateral extent of the display element, indicated by the dashed lines 13, being limited by walls 14. The space 10 comprises a first fluid 15 and a second fluid 16, the first fluid being immiscible with the second fluid. Further details of the second fluid according to embodiments will be explained below. The first support plate 11 includes an element electrode 17, electrically insulated from the space. The element electrode is connected to the signal line 6. A common electrode 18 is in contact with the second fluid 16 and is connected to the signal line 7. A display voltage, output from the driver stage 5, is applied to the electrodes via the signal lines 6 and 7. The position of the first and second fluid within the display element depends on the voltage applied to the electrodes, which position determines the display effect of the display element. Details of the construction and operation of the display element have been described in FIG. 1 and the relating part of the description of International patent publication no. WO2008/119774. Embodiments of the second fluid will however be described below. Further, examples of the composition of the first fluid and a dye of the first fluid are also described below with respect to embodiments.

In accordance with embodiments, there is provided an electrowetting element as described above with reference to FIG. 2, the electrowetting element comprising the first fluid and the second fluid which are immiscible with each other and are switchable between a first configuration and a second configuration by changing a voltage applied to at least one of the first and second fluids, via the electrodes. Less than or equal to 35 wt % of the second fluid is water and a balancing wt % of the second fluid comprises at least one non-aqueous component. The wt % of water in the second fluid may be less than or equal to a maximum equilibrium hygroscopic amount of water. For example, the at least one non-aqueous component may include polyethylene glycol (PEG) 200 with a maximum hygroscopic amount of water (MHAW) of 15 wt %, PEG 300 with a MHAW of 12 wt %, PEG 400 with a MHAW of 11 wt %, ethylene glycol with a MHAW of 30 wt %, diethylene glycol with a MHAW of 21 wt % and/or glycerol with a MHAW of 25 wt %. The hygroscopic amount of water depends on the composition of the balancing wt % of the second fluid and the quantities of each non-aqueous component therein. The wt % of water in the second fluid may be greater than or equal to 0.5, 1, or 1.5 wt %. Alternatively, the wt % of water in the second fluid may be 2 to 35 wt %; 2.5 wt % to 35 wt %; 3 to 35 wt %; 4 to 35 wt %; and 5 to 35 wt %. In other embodiments, the wt % of water in the second fluid may be 0.5 to 34.5 wt %; 0.5 to 34 wt %; 0.5 to 33.5 wt %; 0.5 to 33 wt %; 0.5 to 32.5 wt %; 0.5 to 30 wt %; 0.5 to 25 wt %; 0.5 to 20 wt %; 0.5 to 15 wt %; 0.5 to 10 wt %; 0.5 to 7.5 wt %; 0.5 to 7 wt %; 0.5 to 6.5 wt %; 0.5 to 6 wt %; 0.5 to 5.5 wt %; 0.5 to 5 wt %; 1 to 34.5 wt %; 1 to 34 wt %; 1 to 33.5 wt %; 1 to 33 wt %; 1 to 32.5 wt %; 1 to 30 wt %; 1 to 25 wt %; 1 to 20 wt %; 1 to 15 wt %; 1 to 10 wt %; 1 to 7.5 wt %; 1 to 7 wt %; 1 to 6.5 wt %; 1 to 6 wt %; 1 to 5.5 wt %; 1 to 5 wt %; 1.5 to 34.5 wt %; 1.5 to 34 wt %; 1.5 to 33.5 wt %; 1.5 to 33 wt %; 1.5 to 32.5 wt %; 1.5 to 30 wt %; 1.5 to 25 wt %; 1.5 to 20 wt %; 1.5 to 15 wt %; 1.5 to 10 wt %; 1.5 to 7.5 wt %; 1.5 to 7 wt %; 1.5 to 6.5 wt %; 1.5 to 6 wt %; 1.5 to 5.5 wt %; and 1.5 to 5 wt %. Further, in different embodiments, the wt % of water in the second fluid may be 2 to 32 wt %; 2.5 to 31 wt %; 3 to 30 wt %; 3.5 to 29 wt %; 4 to 28 wt %; 4.5 to 27 wt %; 5 to 26 wt %; 5.5 to 25 wt %; 6 to 24 wt %; 6.5 to 23 wt %; 7 to 22 wt %; 7.5 to 21 wt %; 8 to 20 wt %; 8.5 to 19 wt %; 9 to 18 wt %; 9.5 to 17 wt %; 10 to 16 wt %; 10.5 to 15 wt %; 11 to 14 wt %; and 11.5 to 13 wt %. In alternative embodiments the wt % of water in the second fluid may be zero; in such embodiments the balancing wt % is 100 wt % of the total weight of the second fluid.

The at least one non-aqueous component may comprise at least one component with a general formula comprising carbon and oxygen, a ratio of the number of oxygen atoms to the number of carbon atoms being greater than 1:2, there being at least two carbon atoms. The balancing wt % of the second fluid may comprise one, two, three or more non-aqueous components. In embodiments each component of the at least one non-aqueous component of the balancing wt % conforms to this general formula. The at least one non-aqueous component may be selected from the example compounds described below.

The at least one non-aqueous component may comprise a polyether which may be a polyethylene glycol having the general formula:

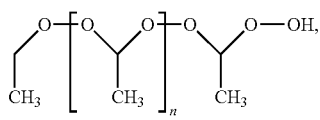

n being an integer, and for example n being 1 to 20, 1 to 15, 1 to 10, 1 to 5, or in an embodiment n=1.

The at least one non-aqueous component may additionally or alternatively comprise a peroxide for example a polymeric diethyl ether peroxide having the general formula:

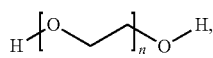

n being an integer, and for example being 1 to 20, 1 to 15, 1 to 10, 1 to 5, or in an embodiment n=1.

The at least one non-aqueous component may additionally or alternatively comprise at least one polyol, for example a diol, for example ethylene glycol having the formula:

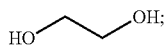

propylene glycol having the formula:

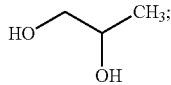

ethylene glycol substituted with at least one heteroatom; propylene glycol substituted with at least one heteroatom; derivatives thereof; and/or combinations thereof.

Additionally or alternatively the polyol may be a triol, for example glycerol having the formula:

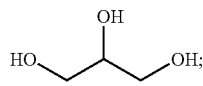

butanetriol; pentanetriol; derivatives thereof; and/or combinations thereof.

Additionally or alternatively the polyol may be a tetraol, for example erythritol having the formula:

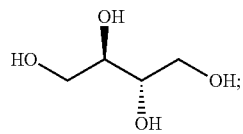

derivatives thereof; and/or combinations thereof.

The at least one non-aqueous component may additionally or alternatively comprise at least one of the following: an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; and/or aconitric acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; derivatives thereof; and combinations thereof.

In some embodiments the at least one non-aqueous component includes a first non-aqueous component which may be ethylene glycol; diethyleneglycol; polyethylene glycol; propylene glycol; dioxalane; glyoxal; citric acid; oxalic acid; oxamic acid; or formic acid, and the at least one non-aqueous component includes a second non-aqueous component which is different from the first non-aqueous component and may be erythritol; ethylene carbonate; propylene carbonate; ethylene glycol; glycerol; or butanetriol. In such embodiments where the balancing wt % comprises only two non-aqueous components, the balancing wt % may comprise a ratio of a first non-aqueous component wt % to a second non-aqueous component wt % of 100:0, 90:10, 80:20, 75:25, 70:30, 65:35, 60:40, 55:45, 50:50, 45:55, 40:60, 35:65, 30:70, 25:75, 20:80, 10:90 or 0:100. These ratios apply to embodiments where the first and second non-aqueous components are, respectively, ethylene glycol and ethylene carbonate, ethylene glycol and propylene carbonate, ethylene glycol and glycerol, diethylene glycol and glycerol, or polyethylene glycol and glycerol, as well as to other embodiments. In further embodiments ethylene carbonate or propylene carbonate may be added also to the mixtures of two non-aqueous components just described.

In other embodiments where the balancing wt % comprises more than two non-aqueous components, the ratio of non-aqueous components will be modified accordingly so the total wt % of the non-aqueous components equals the balancing wt %. In embodiments where the water wt % is zero the non-aqueous components constitute the total wt % of the second fluid; accordingly, where the second fluid comprises only two non-aqueous components, for example, a first to second non-aqueous component wt % ratio of 80:20 of the balancing wt % equates to a first to second non-aqueous component 80:20 ratio of the total weight of the second fluid.

Depending on the composition of the second fluid of embodiments, the second fluid may have a surface tension greater than 30, 35, 40 or 45 mN m$^{-1}$. The second fluid may further be formulated to have a desired viscosity; for example, a viscosity of 200 cPoise is suitable for displaying video content. Moreover, the second fluid may be formulated to have a desired density, for example to match a density of the first fluid in order to avoid gravity effects on the fluid configuration in the element.

In embodiments the first fluid comprises at least one dye and the composition of the second fluid is selected in accordance with the at least one dye. A dye in the first fluid may for example be a naphthoquinone dye, an anthraquinone dye, an azo dye, a thienylazo dye and/or a Foron® dye including those described in International patent publication nos. WO/2008/142086, WO/2010/031860 and WO/2005/098524. As explained above, an appropriate composition of the second fluid can be chosen in accordance with a dye in the first fluid, to reduce photo-bleaching of the dye. The second fluid composition may also be chosen in accordance with any other components of the first fluid, for example a base solvent, examples of which include an alkane, for example hexane, heptane, octane, nonane, decane, undecane, dodecane, tridecane, tetradecane, and pentadecane; an oil, for example silicone oil; a cyclic alkane, for example decaline; and/or mixtures thereof. The first fluid and the second fluid need to be formulated to be sufficiently immiscible with each other for suitable switching performance and to give a desired element lifetime.

The embodiments of the second fluid described herein may be manufactured by mixing the appropriate quantities of the second fluid components together and continuously stirring for two days at room temperature, for example. Sonication may alternatively be used. After this process and before filling the electrowetting element, the excess air may also be removed from the second fluid. The second fluid may be incorporated into the electrowetting element using a filling method such as that described in International patent publication no. WO/2008/125644.

The above embodiments are to be understood as illustrative examples. Further embodiments are envisaged. For example, further compounds within the chemical classes given above are envisaged as alternative and/or additional non-aqueous components of the balancing wt %. For example, further diols from those disclosed above are envisaged.

Further, derivatives not described explicitly for the examples of non-aqueous compounds given above are nonetheless included within the scope of the claims. Such derivatives include structural isomers and stereoisomers. Moreover, it is envisaged that the examples of the non-aqueous compounds described above may be substituted by at least one heteroatom, and such substituted compounds also form part of the description of embodiments. Such heteroatoms may include halogen atoms such as Cl, F, Br and I; N, S, B and P, for example. It is further envisaged the balancing wt % may include a mixture of any of the non-aqueous components described herein.

Numerical ranges are given above. Although minimum and maximum values of such ranges are given, each numerical value between the minimum and maximum values, including rational numbers, should be understood to be explicitly disclosed herein. For example, a range of 0.5 to 35 wt % discloses also numerical values of for example 1 wt %, 10.6 wt %, and 16.58 wt %.

Example embodiments of mixtures of non-aqueous components in the second fluid are described above; it is envisaged that further, different, mixtures of any of the non-aqueous components described above may be used to form the balancing wt % of the second fluid.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting element comprising:
   a first fluid;
   a second fluid substantially immiscible with the first fluid, the second fluid comprising water, wherein a wt % of the water of the second fluid is greater than or equal to 0.05 wt % and less than or equal to 15 wt %; and
   a support plate comprising:
   an electrode, and
   a surface in contact with at least the first fluid.

2. The electrowetting element according to claim 1, wherein the wt % of the water of the second fluid is less than or equal to a maximum equilibrium hygroscopic amount of water.

3. The electrowetting element according to claim 1, wherein the wt % of the water of the second fluid is less than or equal to 0.5 wt %.

4. The electrowetting element according to claim 1, wherein the first fluid comprises a dye.

5. The electrowetting element according to claim 1, the first fluid comprising at least one of: an oil, an alkane, or a cyclic alkane.

6. The electrowetting element according to claim 5, wherein the oil comprises silicone oil.

7. The electrowetting element according to claim 5, wherein the alkane comprises at least one of: hexane, heptane, octane, nonane, decane, undecane, dodecane, tridecane, tetradecane, or pentadecane.

8. The electrowetting element according to claim 5, wherein the cyclic alkane comprises decalin.

9. The electrowetting element according to claim 1, wherein the first fluid comprises approximately 0 wt % of water.

10. The electrowetting element according to claim 1, wherein a balancing wt % of the second fluid does not comprise water.

11. The electrowetting element according to claim 1, wherein a wt % of the second fluid of less than or equal to 99.95 wt % and greater than or equal to 85 wt % does not comprise water.

12. The electrowetting element according to claim 1, wherein the second fluid comprises at least one component selected from the group consisting of:
   a polyether,
   a polyethylene glycol having the general formula:

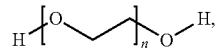

wherein n is an integer,
   a polyethylene glycol having the general formula:

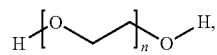

wherein n is an integer and n=1 to 20, 1 to 15, 1 to 10, 1 to 5, or 1,
   a peroxide,
   a polymeric diethyl ether peroxide having the general formula:

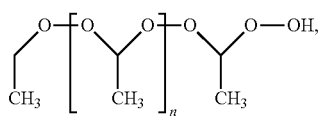

wherein n is an integer, or
a polymeric diethyl ether peroxide having the general formula:

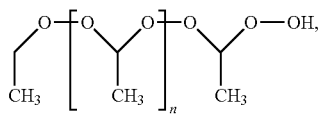

wherein n is an integer and n=1 to 20, 1 to 15, 1 to 10, 1 to 5, or 1, a derivative thereof, and a combination thereof.

13. The electrowetting element of claim 1, wherein the second fluid comprises at least one component selected from the group consisting of:
a polyol, a diol, ethylene glycol, propylene glycol, ethylene glycol substituted with at least one heteroatom, propylene glycol substituted with at least one heteroatom, a triol, glycerol, butanetriol, pentanetriol, a tetraol, erythritol, a derivative thereof, and a combination thereof.

14. The electrowetting element according to claim 1, the second fluid comprising at least one component selected from the group consisting of:
an ether, dioxalane, dimethoxymethane, 1;1-dimethoxyethylene, an amide, a polyamide, a carboxylic acid, formic acid, acetic acid, propanoic acid, glycolic acid, a heteroatom substituted carboxylic acid, a halogenated carboxylic acid, chloroacetic acid, trifluoroacetic acid, a dicarboxylic acid, oxalic acid, malonic acid, succinic acid, glutaric acid, a tricarboxylic acid, citric acid, aconitric acid, an ester, methyl acetate, ethyl lactate, a sulphone, dimethyl sulphate, dimethyl sulphite, methylsulphonylmethane, an aldehyde, acetaldehyde, glyoxal, methylglyoxal, a peroxide, methyl ethyl ketone peroxide, oxamic acid, organosulphoxide, ethylene carbonate, propylene carbonate, diethylene glycol, a derivative thereof, and a combination thereof.

15. The electrowetting element according to claim 1, wherein the second fluid comprises:
a first component selected from the group consisting of: ethylene glycol, diethyleneglycol, polyethylene glycol, propylene glycol, dioxalane, glyoxal, citric acid, oxalic acid, oxamic acid, and formic acid, and
a second component different from the first component and selected from the group consisting of: erythritol, ethylene carbonate, propylene carbonate, ethylene glycol, glycerol, and butanetriol.

16. The electrowetting element according to claim 15, wherein a ratio in the second fluid of a wt % of the first component to a wt % of the second component is approximately: 90:10, 80:20, 75:25, 70:30, 65:35, 60:40, 55:45, 50:50, 45:55, 40:60, 35:65, 30:70, 25:75, 20:80, or 10:90.

17. The electrowetting element according to claim 1, wherein the second fluid comprises at least one component each independently having a general formula comprising at least two carbon atoms and at least one oxygen atom, a ratio of the at least one oxygen atom to the at least two carbon atoms being greater than 1:2.

18. The electrowetting element according to claim 1, wherein the second fluid has a surface tension of at least one of:
greater than 30,
greater than 35,
greater than 40, or
greater than 45 mN m$^{-1}$.

19. The electrowetting element according to claim 1, wherein, by application of a voltage between the second fluid and the electrode, the first fluid and the second fluid are switchable between:
a first configuration with the first fluid in contact with an area of the surface; and
a second configuration with the second fluid in contact with the area of the surface.

20. A display apparatus comprising:
an electrowetting element comprising:
a first fluid;
a second fluid substantially immiscible with the first fluid, the second fluid comprising water, wherein a wt % of the water of the second fluid is greater than or equal to 0.05 wt % and less than or equal to 15 wt %; and
a support plate comprising:
an electrode, and
a surface in contact with at least the first fluid; and
a display driving system for controlling application of a voltage between the electrode and the second fluid to switch the first fluid and the second fluid between:
a first configuration with the first fluid in contact with an area of the surface, and
a second configuration with the second fluid in contact with the area of the surface.

21. The display apparatus of claim 20, wherein the wt % of the water of the second fluid is less than or equal to a maximum equilibrium hygroscopic amount of water.

22. The display apparatus of claim 20, wherein the wt % of the water of the second fluid is less than or equal to 0.5 wt %.

23. The display apparatus of claim 20, wherein at least one of:
the first fluid comprises a dye;
the first fluid comprises at least one of: an oil, an alkane, or a cyclic alkane;
the first fluid comprises silicone oil;
the first fluid comprises at least one of: hexane, heptane, octane, nonane, decane, undecane, dodecane, tridecane, tetradecane, or pentadecane; or
the first fluid comprises decalin.

24. The display apparatus of claim 20, wherein the first fluid comprises approximately 0 wt % of water.

25. The display apparatus of claim 20, wherein a balancing wt % of the second fluid does not comprise water.

26. The display apparatus of claim 20, wherein a wt % of the second fluid of less than or equal to 99.95 wt % and greater than or equal to 85 wt % does not comprise water.

27. The display apparatus of claim 1, wherein the second fluid comprises at least one component selected from the group consisting of:
a polyether, a polyethylene glycol having the general formula:

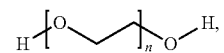

wherein n is an integer,
a polyethylene glycol having the general formula:

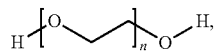

wherein n is an integer and n=1 to 20, 1 to 15, 1 to 10, 1 to 5, or 1,
a peroxide,
a polymeric diethyl ether peroxide having the general formula:

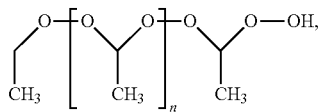

wherein n is an integer,
a polymeric diethyl ether peroxide having the general formula:

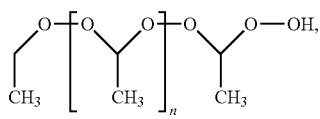

wherein n is an integer and n=1 to 20, 1 to 15, 1 to 10, 1 to 5, or 1, a polyol, a diol, ethylene glycol, propylene glycol, ethylene glycol substituted with at least one heteroatom, propylene glycol substituted with at least one heteroatom, a triol, glycerol, butanetriol, pentanetriol, a tetraol, erythritol, a derivative thereof, and a combination thereof.

28. The display apparatus of claim 20, wherein the second fluid comprises:
a first component selected from the group consisting of: ethylene glycol, diethyleneglycol, polyethylene glycol, propylene glycol, dioxalane, glyoxal, citric acid, oxalic acid, oxamic acid, and formic acid, and
a second component different from the first component and selected from the group consisting of: erythritol, ethylene carbonate, propylene carbonate, ethylene glycol, glycerol, and butanetriol.

29. The display apparatus of claim 20, the display driving system comprising:
a driver stage with an output for at least one signal to apply the voltage between the electrode and the second fluid;
a controller connected to the driver stage and configured to, in response to a data signal input to the display driving system, control the driver stage to output the at least one signal.

* * * * *